United States Patent
Orth, Jr.

[11] 3,918,034
[45] Nov. 4, 1975

[54] OIL DETECTION AND SIGNALING SYSTEM
[75] Inventor: George Otto Orth, Jr., Seattle, Wash.
[73] Assignee: Petrotek, Inc., Bellevue, Wash.
[22] Filed: Feb. 11, 1974
[21] Appl. No.: 441,251

[52] U.S. Cl. .................. 340/236; 73/448; 340/224
[51] Int. Cl.² .................. G08B 21/00; G08B 1/08
[58] Field of Search .......... 340/236, 261, 244, 224; 73/32, 61.1, 311, 448

[56] References Cited
UNITED STATES PATENTS
| | | | |
|---|---|---|---|
| 3,603,952 | 9/1971 | Smith | 340/236 X |
| 3,719,936 | 3/1973 | Daniels et al. | 340/236 |
| 3,733,594 | 5/1973 | Orth, Jr. | 340/236 |

Primary Examiner—John W. Caldwell
Assistant Examiner—Daniel Myer
Attorney, Agent, or Firm—Seed, Berry, Vernon & Baynham

[57] ABSTRACT

A detector unit and system for detecting and signaling the presence of an oil slick on the body of water. An oil sensing assembly consists of a hydrophobic, oleophilic oil sensing material secured to one end of a rod and a magnet secured to the opposite end of the rod, the rod extending into the central bore of a water-tight ballasted shell which houses a battery-powered transmitter. An adjustable magnetic reed switch is positioned in the housing for actuation by the magnet secured to the rod to initiate an output signal from the transmitter. A wire cage surrounds the oil sensing material. An antenna connected to the output of the transmitter extends upwardly from the wire cage. Arms having floats on their terminating ends extend laterally outwardly from the shell, the floats having sufficient flotation capacity to suspend the unit in the water. The oil sensing assembly incorporating the hydrophobic oil sensing material is sufficiently buoyant to float on the surface of the water. When the oil sensing material contacts oil floating on the surface of the water, the assembly sinks into the water, moving the target adjacent the reed switch to close it and initiate an output signal from the transmitter which is received by a corresponding receiver. The receiver activates an audio or visual alarm.

12 Claims, 6 Drawing Figures

3,918,034

OIL DETECTION AND SIGNALING SYSTEM

BACKGROUND OF THE INVENTION

1. Field of the Invention

This invention relates to a unit and system for detecting and signaling the presence of oil floating on the surface of a body of water.

2. Prior Art Relating to the Disclosure

U.S. Pat. No. 3,733,594 discloses an oil detector for detecting and signaling the presence of oil on the surface of a body of water. The unit incorporates a hydrophobic oleophilic oil absorbent as the oil sensing material. The unit described herein is an improvement over that disclosed in the above-mentioned patent in that it has greater stability in the water, is more reliable, incorporates an improved oil sensing material and assembly and incorporates the bulk of the unit in a water-tight shell suspended in the water rather than above the water.

SUMMARY OF THE INVENTION

The primary object of this invention is to provide a reliable, relatively inexpensive detector unit and system for detecting oil slicks floating on the surface of a body of water.

Further objects of this invention are to provide an oil detector unit; (1) which incorporates an improved oil sensing material consisting of a loose batt of fibers treated with a silyl compound, (2) which utilizes a reliable transmitter-receiver system for signaling an alarm when an oil slick is detected, (3) which incorporates an improved oil sensing assembly which triggers an alarm or causes transmission of an output signal through a proximity switch which is closed when the oil sensing assembly sinks into the water and moves within a predetermined distance of the switch, and (4) which is stable in water over extended periods of time. The unit comprises: (1) a ballasted water-tight housing having a central bore extending therethrough, (2) a bridle connected to the housing having a plurality of arms extending laterally outwardly therefrom with floats secured to the ends of each of the arms having insufficient flotation capacity to suspend the unit in the water, (3) an oil sensing assembly including a floating oil sensing material secured to one end of a rod received in the bore of the housing for free vertical movement therein, the oil sensing assembly sinking into the water on detection by the oil sensing material of a sufficient amount of oil on the surface of the water, (4) proximity switch means in the housing actuated in response to the position of the oil sensing assembly in the water and (5) signal means rendered operative by the proximity switch means when the oil sensing material sinks into the water.

BRIEF DESCRIPTION OF THE DRAWINGS

FIG. 5 is an enlarged partial perspective view of the adjustable slip ring incorporating the proximity switch.

DESCRIPTION OF THE PREFERRED EMBODIMENTS

"Oil" as used herein generally refers to mixtures of hydrocarbons such as crude petroleum and distillate products thereof, although the unit can be used to detect the presence of other oils, such as animal or vegetable oils not mixable with water, or liquids not mixable with water but soluble in ether, naphtha, alcohol or other organic solvents, the liquid remaining in essentially the liquid state when floating on a body of water.

Figure 1:
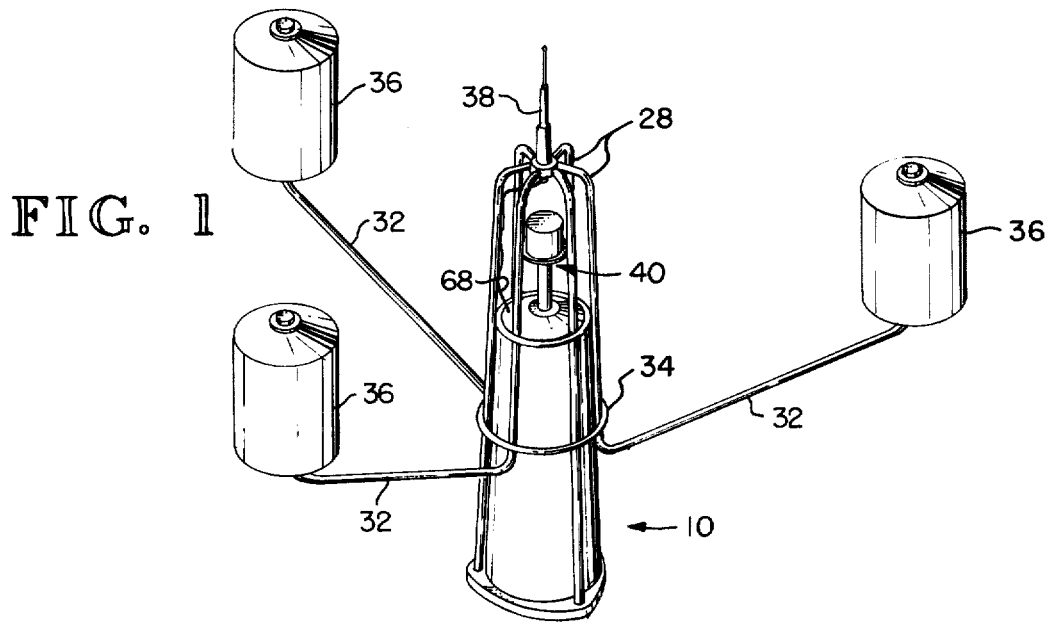
FIG. 1 is a perspective view of the detector unit of this invention.

FIG. 1 is a perspective view of the detector unit of this invention which includes a water-tight shell or housing supported in a body of water by floats connected to the housing by arms which form a cage around an oil sensing material. An antenna extends upwardly from the apex of the cage, the antenna connected to the output of signal means sealed within the housing.

The housing 10 may be made of any suitable material which will withstand prolonged exposure to sea or fresh water under all kinds of weather conditions. The housing illustrated is an elongated hollow, molded plastic cylinder 12 closed at one end by an integral end wall 13 which has a central inwardly flanged opening 15 therein. A hollow stem 14 threaded on one end is secured at its opposite end around flange 15, the stem extending the length of cylinder 12. A cap 16 having a threaded central opening therein and an O-ring 18 secured in an annular groove within the threaded opening seals the open end of the cylinder 12. If necessary, an additional O-ring may be inserted in a groove around the lower edge of the cylinder 12 to insure against water leakage into the interior of the housing. The cap also includes laterally extending flanges 17 to which the legs of a wire bridle are secured as will be described. A ballast material 20 such as lead, concrete or other suitable material, is positioned in the lower end of the housing as illustrated. A transmitter 22 and batteries 24 for powering the transmitter are also sealed within the housing 10 as illustrated. Foamed platic may be used to fill the voids within the housing, if desired.

Figure 3:
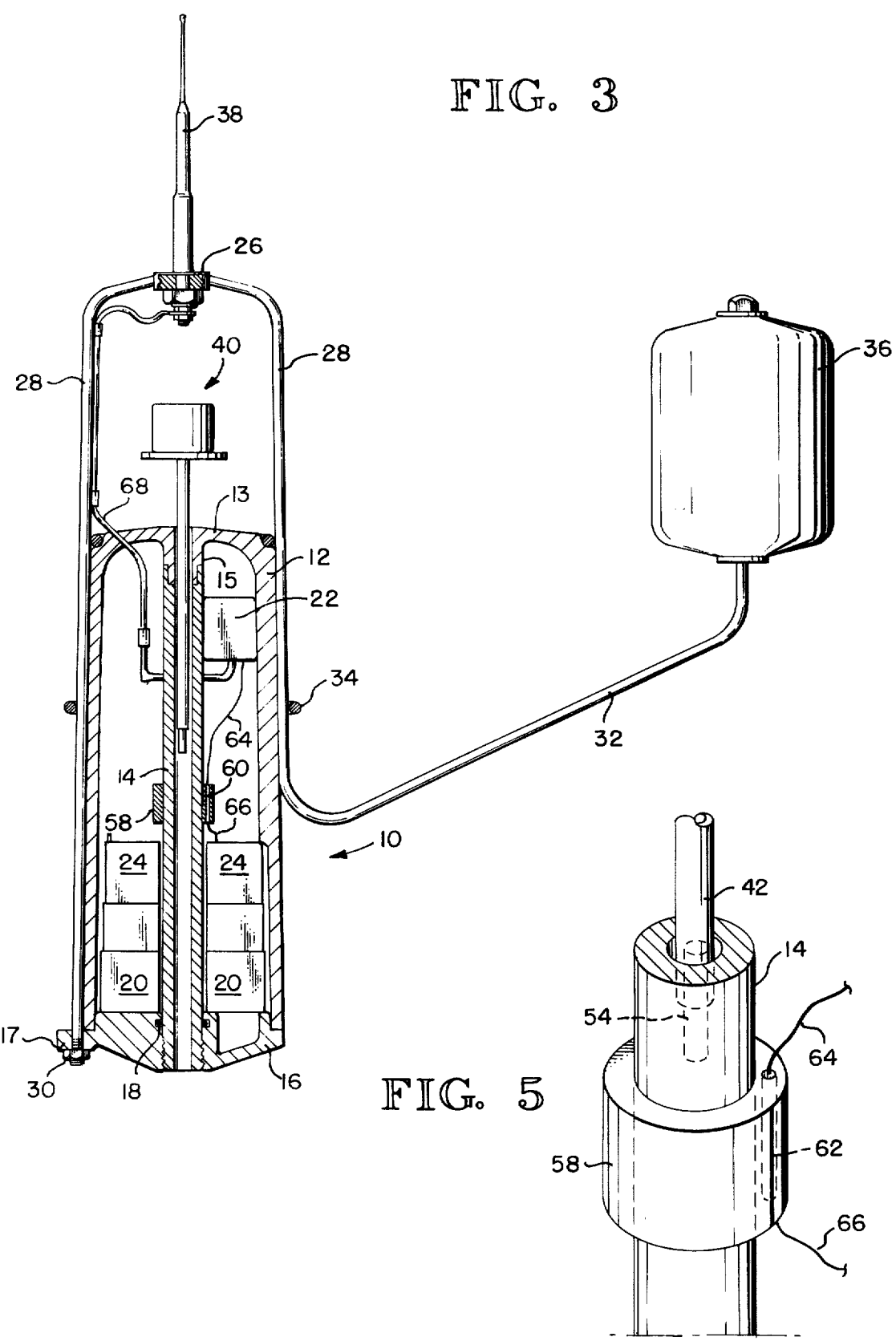
FIG. 3 is a vertical cross-section of the unit of FIG. 1.

A wire bridle is secured to the housing, the bridle comprising a plurality of legs 28 threaded on one end and secured to the housing through openings in flanges 17 by nuts 30. Each of the legs extends initially upwardly parallel to the housing 10 to a point above the housing, then is bent at a right angle to connect to a plate 26 forming the central apex of the bridle. The remaining portion of each leg extends from the opposite side of the plate 26 downwardly and parallel to the opposite side of the housing, laterally outwardly and then upwardly to form an arm 32. Floats 36 are secured to the ends of each of the legs, the floats providing sufficient flotation capacity to suspend the housing in the water. The floats may be foamed polystyrene, polyethylene or other suitable material. Preferably, the floats are adjusted to suspend the housing 10 just beneath the surface of the water as illustrated in FIG. 3. The plurality of legs extending above the housing form a cage around the oil sensing assembly 40 to prevent damage thereto by floating debris or other means. A retainer ring 34 clamps the legs of the bridle against the side of the housing to secure them in place.

An antenna 38 is secured to the apex plate 26 and extends upwardly therefrom.

Figure 6:
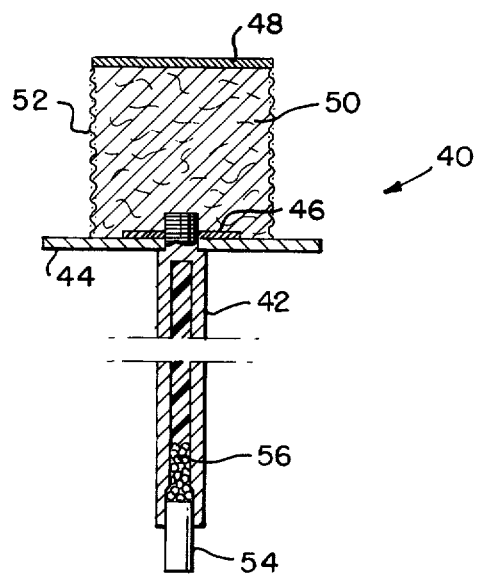
FIG. 6 is a side elevation view of the oil sensing assembly.

The oil sensing assembly 40 is shown in detail in FIG. 6 and includes a hollow rod of plastic or other suitable material 42 threaded at its upper end. A plate 44 having a central threaded opening is threaded over the threaded portion of the rod and secured by a retainer ring 46. The oil sensing material 50 may be any of a number of materials secured to the rod or held in place by a cylindrical open mesh screen 52 adhered at its lower end to plate 44 and at its upper end to cap 48. Materials which may be used include: (1) those mentioned in U.S. Pat. No. 3,733,594, (2) inorganic or organic fiber treated with silicon oils, organosilanes, "Silanox" or mixtures of the above to render the fiber hydrophobic and oleophilic. "Silanox," a product of Cabot Corporation, is a material consisting of trimethylsilyl groups attached to the surface of a fumed silicon dioxide, (3) oil soluble, water insoluble coating on screen 52 such as butadiene latices manufactured by Goodyear, or (4) a fine mesh screen having openings one-sixteenth inch or less coated with "Silanox" used as screen 52.

Inorganic fiber which may be used includes glass fiber and mineral fiber. Organic fiber which may be used includes polyester, nylon, acrylic, polypropylene, etc. The preferred oil absorbing fiber is an inorganic or organic fiber coated with "Silanox."

In regard to (4) above, the "Silanox" coated cylindrical screen prevents passage of water into the interior of the cylinder due to surface tension and the small openings in the screen. However, when oil contacts the coated screen the surface tension is broken allowing water to pass into the interior of the cylinder and increasing the specific gravity of the oil sensing assembly above that of water so that the assembly sinks into the water. A hydrophilic material may be placed in the interior of the cylinder to absorb the water entering through the screen adding additional weight to cause the oil sensing assembly to sink into the water.

In regard to (3) above, the screen 52 is sealed with an oil soluble, water insoluble material which prevents passage of water into the interior of the cylinder. The oil sensing assembly incorporating this type of oil sensing material is made sufficiently buoyant to float on the surface of the water until oil contacts and dissolves the coating, allowing water to flood the interior of the cylinder and cause the assembly to sink into the water. As with (4) above a hydrophilic material may be placed in the interior of the cylinder.

A permanent magnet 54 is adhesively secured to the opposite end of the rod as illustrated in FIG. 6. An amount of ballast 56, such as lead shot, is put into the hollow interior of the rod 42 to increase the specific gravity of the assembly so that when the oil sensing material absorbs a certain amount of oil, the assembly becomes heavier than water and sinks.

The unit described utilizes a proximity switch 62 such as a magnetic reed switch to energize a transmitter 22 for transmission of an output signal through antenna 38 to a remote receiver. When the oil absorbent material 50 absorbs a sufficient amount of oil, the oil sensing assembly sinks into the water and triggers the switch 62 to energize the transmitter.

Referring to FIG. 3, a friction fit ring 58 is slipped around stem 14. A channel 60 is bored through the slip ring as shown in FIG. 5 and a magnetic reed switch 62 is secured therein. Cables 64 and 66 lead from the magnetic reed switch to the transmitter and battery respectively. Cable 68 is connected at one end to the antenna 38 and extends through the housing 10 to connect with the output of the transmitter.

The position of the magnetic reed switch is adjusted relative to the permanent magnet 54 so that when the oil sensing assembly sinks into the water, the magnet 54 moves sufficiently close to the switch to close it and energize the transmitter.

The electronics portion of the detector system may utilize any of a number of conventional transmitter-receiver systems for activating a visual or audio signal. The system illustrated in FIGS. 2 and 4 discloses a number of oil detection activated tone encoded transmitters and a tone decoding receiver which controls a relay and indicator lamp.

Rather than incorporate means in the unit to signal detection of an oil slick, the lead wires from the reed switch may be extended through the housing 10 and connected to any type of signal means such as the transmitter means of a signal transmitting buoy located along a waterway.

The transmitter 22 is set up to operate on one of 23 channels between 26.97 and 27.27 MHz. The transmitter, upon detection of oil, transmits two audio tones with a 360 millisecond unmodulated period between tones. Four tone channels are available allowing 12 combinations of two different tones. The tone sequence is repeated every 2–4 seconds.

Figure 4:
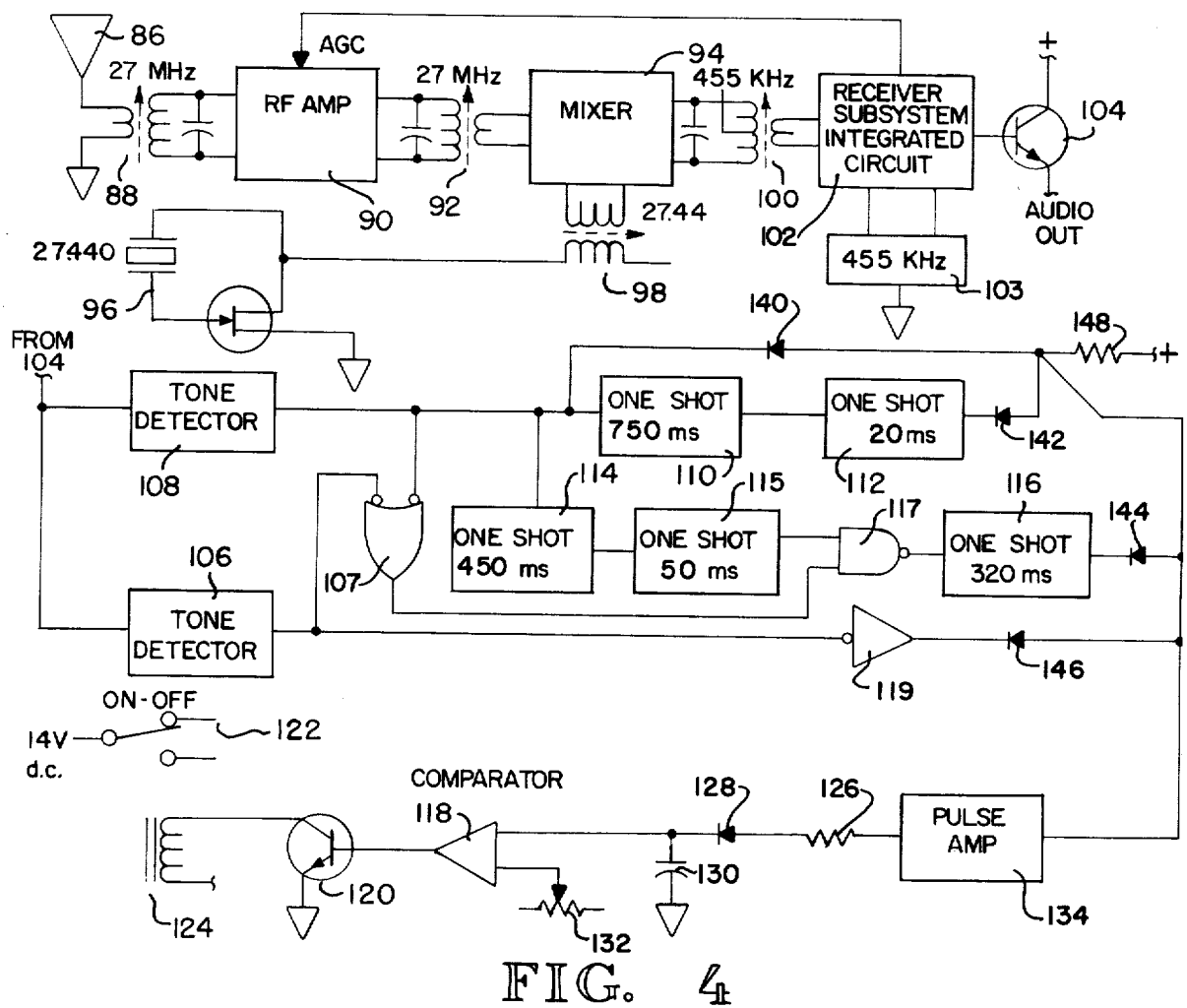
FIG. 4 is a block schematic of the receiver.

The receiver, shown in FIG. 4, operates on the same channel as the transmitter. A quartz crystal 96 assures stability and eliminates retuning in the field. The receiver includes tone detectors 106 and 108 responding to audio frequencies corresponding to the tone generators in the transmitter. As will be explained hereinafter, signal processing circuit allows the time delay circuit to ignore extraneous tone signals which may be received on the transmitter frequency. After reception of 3 to 4 correct tone pairs, the receiver actuates a relay 124 to illuminate an indicator lamp, sound an alarm or other such signal (not shown). The relay remains actuated until manually reset. Rather than put the time delay circuit in the receiver, it may be included in the transmitter so that there is no transmission of an output signal until the magnetic reed switch remains closed for a predetermined period of time, generally 5 to 7 seconds.

Figure 2:
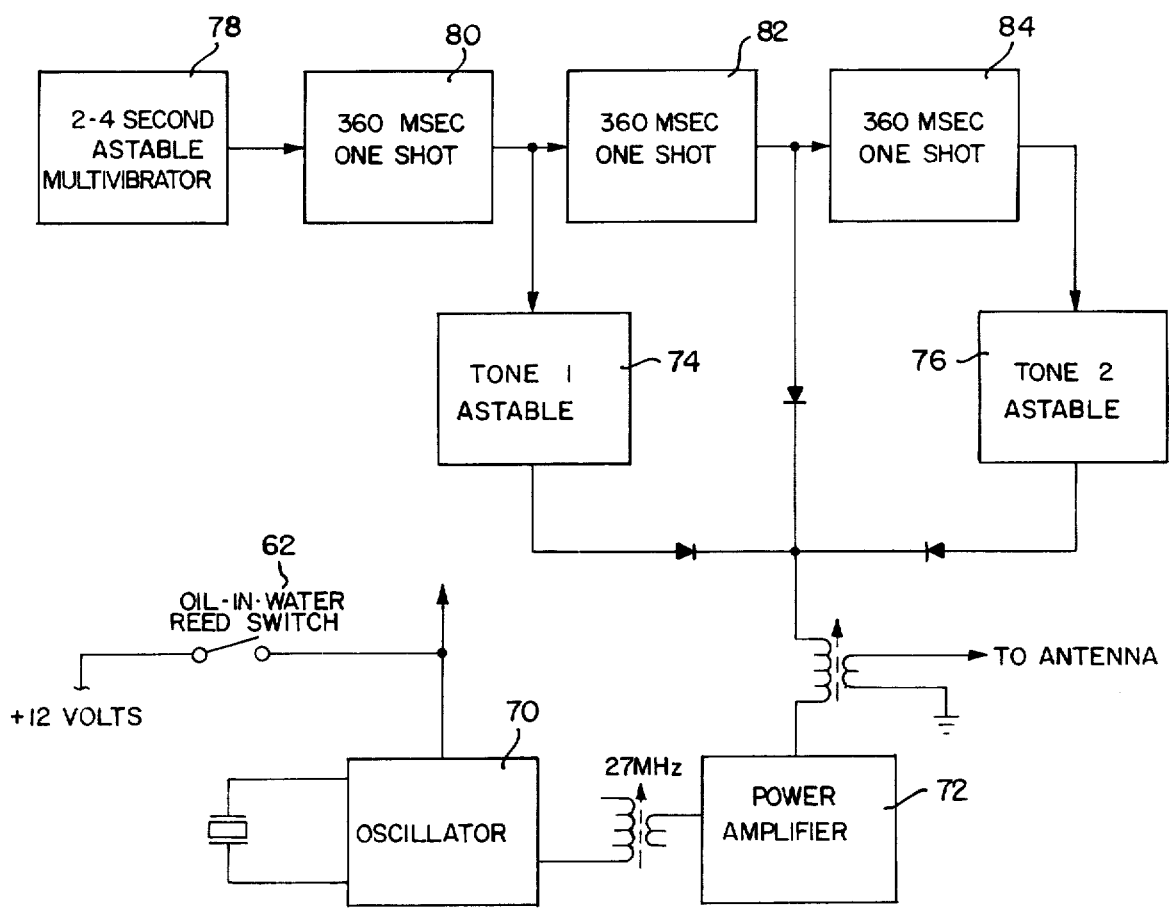
FIG. 2 is a block schematic of the transmitter housed within the detector unit.

The transmitter illustrated in block diagram form in FIG. 2 consists of a two stage, crystal controlled transmitter and a two tone modulator controlled by a number of timers. The transmitter consists of a crystal oscillator 70 utilizing a crystal cut to a frequency between 26.98 and 27.26 MHz. The oscillator collector load is a resonant coupling transformer which couples the oscillator output to a power amplifier 72, such as a class C amplifier. The average power output of the amplifier is limited by an emitter resistor.

The transmitter is modulated by two oscillators 74 and 76, shown here as astable multivibrators. The frequency of the multivibrators is determined by a resistor-capacitor combination with the exact frequency set by trimmer potentiometers. Astable multivibrator 78 is connected as a timer and operates at a frequency of approximately 1 pulse every 2 to 4 seconds. All of the one shots 80, 82, 84 are trailing edge triggered. Thus the output of timer 78 triggers a delay one shot or monostable multivibrator 80 which produces a positive output with a period of about 360 milliseconds. During this time period, power is applied to oscillator 74 which modulates the power amplifier at an audio rate. At the end of the 360 millisecond time period, the output of one shot 80 drops to zero triggering one shot 82. One shot 82 produces a 360 millisecond wide output pulse which turns the transmitter on without modulation. At the end of this period, one shot 84 is triggered for a 360 millisecond time interval. While the output of one shot 84 is high, power is applied to oscillator 76 which modulates the power amplifier 72 at an audio rate to generate a second tone. After this interval, the transmitter ceases transmission until the next negative going edge from timer 78 triggers one shot 80. Supply voltage for the power amplifier is only received from the oscillators 74 and 76 and the blank interval generator 82. The oscillator is always operating after oil detection. The transmitter may be adjusted for one of 12 tone combinations. For example, the transmitter may be adjusted to send an initial tone of 667 Hz for 360 milliseconds followed by 360 millisecond silent period followed by 360 millisecond period of 825 Hz tone. The tone pair repeats once every 2 to 4 seconds.

The receiver illustrated in the block diagram in FIG. 4 is a high performance single channel superheterodyne. The received frequency is set by a quartz crystal cut to a frequency 455 KHz above the desired received frequency. The receiver utilizes a conventional R.F. amplifier, mixer and I.F. amplifier detector and AGC generator. The local oscillator is preferably a Pierce oscillator. Audio output from the receiver is applied to two tone decoders with adjustable pass band center width. A signal processing circuit eliminates the possibility of triggering the control relay on random tone signals received on the transmitter channel.

Referring to the schematic, 27 MHz signals received at the antenna 86 are coupled through resonant transformer 88 into an R.F. amplifier 90 with AGC control. The output of amplifier 90 is coupled through transformer 92 to the mixer 94. The mixer also receives an input from local oscillator 96 through transformer 98. The mixer produces an output at 455 KHz which is coupled through resonant transformer 100 into a receiver subsystem integrated circuit 102, consisting of an A.G.C. stage (attenuator), high gain amplifier, audio detector and an AGC detector. AGC voltage from 102 is applied to the circuit input attenuator of 102 and the AGC input of the R.F. amplifier 90. An effective AGC range of over 80 db is obtained. Additional selectivity is obtained at 102 by means of a two stage 455 KHz ceramic filter 103.

The demodulated output of the receiver subsystem integrated circuit 102 is buffered by emitter follower 104 and applied to tone detectors 106 and 108. The outputs of tone detectors 106 and 108 are normally high, but fall to zero upon the occurrence of an appropriate tone from emitter follower 104.

On detection of the first tone from the transmitter, one shot 110 is triggered for a period of about 750 milliseconds. After this time period, trailing edge triggered one shot 112 produces a positive pulse of 20 milliseconds duration. Since 750 milliseconds have elapsed from the start of the first audio tone to the 20 millisecond pulse, the 20 millisecond pulse normally occurs during the early part of the second audio tone. This 20 millisecond pulse serves as a window during which time three other conditions in the circuit are examined. If, during this 20 millisecond interval, these other conditions are met, a charging pulse is applied to an integrating capacitor 130. Two of the three conditions are (1) that the second tone received from the transmitter is present at this time and (2) that the first tone is not present at this time. The third condition which must be met is that a silent period be detected between the first and second tones. On detection of the first tone, one shot 114 is also triggered for a 450 millisecond delay. After this delay, a 50 millisecond positive pulse is generated at the output of one shot 115. If the first or second tone is detected during this period by NOR gate 107, NAND gate 117 will be enabled, thereby allowing the trailing edge of the 50 millisecond pulse to trigger one shot 116 to produce a 320 millisecond negative going pulse.

Diodes 140, 14, 144 and 146, in connection with resistor 148, function as an OR gate to examine the condition of the circuit. If none of the cathodes of the aforementioned diodes is zero, the input to pulse amp 134 will be high, thereby charging capacitor 130 through resistor 126 and diode 128.

A charging pulse is applied to the integrating capacitor only if the following conditions are met: (1) the first tone is received and detected, (output of tone detector 108 is high) (2) the second tone is present 750 milliseconds after detection of the first tone (output of inverter 119 is high), (3) the first tone is not present 750 milliseconds after the first tone is detected (output of tone detector 180 is high), and (4) neither the first or second tone is present between 450 and 500 milliseconds after the first tone detection (output of one shot 116 is high).

Assuming all the conditions are met, a 20 millisecond wide 5 volt pulse is applied to the integrating capacitor 130 through a diode 128 and resistor 126. The voltage on the integrating capacitor steps upward. Assuming that the pairs of tone are received and decoded, the voltage on the integrating capacitor will increase on reception of each pair of tones until the voltage exceeds the comparator 118 threshold established by a trimmer potentiometer 132. The output of the comparator will go from near zero to nearly 5 volts. The output from the comparator is amplified by switch 120 to control a relay and indicator lamp (not shown).

The receiver is powered by a 14 volt D.C. current obtained from a 12 volt transformer 124 with full wave bridge rectifier.

One or more of the detector units of this invention are generally placed around tankers being loaded or unloaded to detect potential oil spills. The units may be deployed at any location where there is a possibility of oil spillage or connected to existing buoys as previously mentioned.

The embodiments of the invention in which an exclusive property or privilege is claimed are defined as follows:

1. An oil-in-water detector unit for detecting and signaling the presence of oil floating on the surface of a body of water, comprising:
  a ballasted, water-tight elongated hollow cylindrical housing sealed at both ends and having a central hollow stem extending therethrough,
  a bridle connected to the housing having a plurality of arms extending from a central apex above one end of the housing and above the level of the water when the unit is floating in the water down along-side housing and then laterally outwardly at spaced intervals around the housing, floats secured to the ends of each of the arms providing sufficient buoyancy to suspend the housing within the water and in a vertical position relative to its longitudinal axis, a ballasted rod having a magnet secured in one end thereof received in the hollow stem for free vertical movement therein, an oil sensing material secured to the opposite end of the rod including (1) a mass of loosely packed fiber material coated with a silyl compound to render the fiber mass substantially hydrophobic so that it does not become waterlogged over an extended period of time and sink into the water and (2) an oil and water pervious retaining means retaining the loose fiber mass in position, battery powered transmitter means mounted in the housing for transmitting an output signal, an antenna extending upwardly from the apex of the bridle operatively connected to the transmitter means for transmitting the output signal, and a magnetic reed switch adjustably secured within the housing around the stem operatively connected to the transmitter means for actuation by the magnet secured to the rod, the switch positioned along the stem to be actuated when the sensing material absorbs sufficient oil to sink into the water and cause the magnet to close the switch and initiate an output signal from the transmitter means.

2. An oil-in-water detection unit for detecting and signaling the presence of oil floating on the surface of a body of water, comprising:

a ballasted, water-tight housing having a central bore extending therethrough, means for maintaining the housing partially afloat in the water with the bore substantially vertical, an oil sensing assembly including a rod received in the bore of the housing for free vertical movement and a floating oil sensing material secured to one end of the rod having sufficient buoyancy to float the assembly on the water surface, the oil sensing assembly sinking into the water upon detection by the sensing material of oil floating on the surface of the water due to an increase in the specific gravity of the assembly above that of water, a magnetic reed switch secured adjacent the central bore of the housing and a magnet secured to the end of the rod extending down into the bore, the magnet closing the reed switch when the oil sensing assembly sinks into the water, and signal means rendered operative by the reed switch when the oil sensing assembly sinks into the water.

3. The detector unit of claim 2 wherein the position of the magnetic reed switch relative to the magnet is adjustable.

4. An oil-in-water detection unit for detecting and signaling the presence of oil floating on the surface of a body of water, comprising:

a ballasted, water-tight housing having a central bore extending therethrough, means for maintaining the housing partically afloat in the water with the bore substantially vertical, an oil sensing assembly including a rod received in the bore of the housing for free vertical movement and a floating oil sensing material secured to one end of the rod having sufficient buoyancy to float the assembly on the water surface, the oil sensing assembly sinking into the water upon detection by the sensing material of oil floating on the surface of the water due to an increase in the specific gravity of the assembly above that of water, proximity switch means in the housing means actuated in response to the position of the oil sensing assembly in the water, powered transmitter means sealed within the housing generating an output signal comprising a carrier modulated by multiple audio tone signals, said transmitter means including a time-delay circuit for preventing energization of the transmitter by switch closure caused by wave action, antenna means operatively connected to the transmitter means for radiating the output signal, and receiver means for receiving the output signal from the antenna and activating an alarm, said receiver means operating on the same frequency channel as the transmitter means and including tone detectors responsive to the audio tones which modulate the transmitter carrier.

5. An oil-in-water detection system for detecting and signaling the presence of oil floating on the surface of a body of water, comprising:

a ballasted, water-tight housing having a central bore extending therethrough, means for maintaining the housing partially afloat in the water with the bore substantially vertical, an oil sensing assembly including a rod received in the bore of the housing for free vertical movement and a floating oil sensing material secured to one end of the rod having sufficient buoyancy to float the assembly on the water surface, the oil sensing assembly sinking into the water upon detection by the sensing material of oil floating on the surface of the water due to an increase in the specific gravity of the assembly above that of water, proximity switch means in the housing actuated in response to the position of the oil sensing assembly in the water, a transmitter mounted in the housing rendered operative by the proximity switch means when the oil sensing assembly sinks a predetermined amount into the water, the transmitter generating a carrier which is modulated in a predetermined pattern, an antenna driven by the transmitter, and a receiver for producing an oil spill indication when the receiver detects the predetermined modulation pattern.

6. The oil-in-water detection system of claim 5 wherein the transmitter carrier is amplitude modulated by first and second audio tones of differing frequency, the audio tones being separated by a blank period wherein the unmodulated carrier is transmitted.

7. The oil-in-water detection system of claim 6 wherein the receiver detects the predetermined modulation pattern by examining the transmitted signal during the second transmitted audio tone to insure that the first transmitted audio tone is not present, that the first audio tone was transmitted before the blank period, and that neither the first nor second audio tone was present during the blank period.

8. In an oil-in-water detection unit for detecting and signaling the presence of oil floating on the surface of a body of water having a ballasted, water-tight housing having a central bore extending therethrough and means for maintaining the housing partially afloat in the water, the detection unit further having an oil sensing assembly including a rod received in the bore of the housing for free vertical movement and a floating oil sensing material secured to one end of the rod having sufficient buoyancy to float the assembly on the water surface, the oil sensing assembly sinking into the water upon detection by the sensing material of oil floating on the surface of the water due to an increase in the specific gravity of the assembly above that of water, the improvement comprising means for adjusting the specific gravity of the oil sensing assembly.

9. The oil sensing assembly of claim 8 wherein the rod is hollow and the means for adjusting the specific gravity of the oil sensing assembly includes a predetermined amount of ballast material inside the hollow rod.

10. The detector unit of claim 5 wherein the oil sensing material comprises a mass of fiber material coated with a silyl compound to render the fiber substantially hydrophobic and oleophilic.

11. The detector unit of claim 5 wherein the oil sensing material is a hollow member having multiple small openings therein coated with a silyl compound which prevents passage of water through the openings until contact of the member with oil.

12. The detector of claim 11 including a hydrophilic material disposed within the hollow member for absorbing water on passage through the openings of the member.

* * * * *